(12) United States Patent
Venkataramani et al.

(10) Patent No.: US 12,423,414 B2
(45) Date of Patent: Sep. 23, 2025

(54) MAYA: A HARDWARE-BASED CYBER-DECEPTION FRAMEWORK TO COMBAT MALWARE

(71) Applicant: The George Washington University, Washington, DC (US)

(72) Inventors: Guru Prasadh V. Venkataramani, Fairfax, VA (US); Preet Derasari, Alexandria, VA (US); Kailash Gogineni, Alexandria, VA (US)

(73) Assignee: The George Washington University, Washington, DC (US)

( * ) Notice: Subject to any disclaimer, the term of this patent is extended or adjusted under 35 U.S.C. 154(b) by 219 days.

(21) Appl. No.: 18/109,733

(22) Filed: Feb. 14, 2023

(65) Prior Publication Data

US 2024/0095341 A1 Mar. 21, 2024

Related U.S. Application Data

(60) Provisional application No. 63/309,833, filed on Feb. 14, 2022.

(51) Int. Cl.
*G06F 21/54* (2013.01)
*G06F 21/56* (2013.01)

(52) U.S. Cl.
CPC ............ *G06F 21/54* (2013.01); *G06F 21/564* (2013.01); *G06F 21/568* (2013.01)

(58) Field of Classification Search
USPC ........................................................ 726/22
See application file for complete search history.

(56) References Cited

U.S. PATENT DOCUMENTS

| | | | | |
|---|---|---|---|---|
| 10,230,745 B2* | 3/2019 | Singh | ............... | H04L 63/1491 |
| 11,062,028 B2* | 7/2021 | Lamay | ............... | G06F 21/568 |
| 11,651,081 B1* | 5/2023 | Powers | ............... | G06N 5/01 |
| | | | | 726/25 |
| 2004/0153574 A1* | 8/2004 | Cohen | ............... | H04L 61/00 |
| | | | | 709/245 |

(Continued)

FOREIGN PATENT DOCUMENTS

| | | | | |
|---|---|---|---|---|
| CN | 109416721 A | * | 3/2019 | ............. G06F 21/60 |
| WO | WO-2020125839 A1 | * | 6/2020 | ............. G06F 21/31 |

OTHER PUBLICATIONS

P. Derasari et al., "MAYAVI: A Cyber-Deception Hardware for Memory Load-Stores", In Proceedings of the Great Lakes Symposium on VLSI 2023 (GLSVLSI '23), Jun. 5-7, 2023, Knoxville, TN, USA. ACM, New York, NY, USA, pp. 563-568. https://dl.acm.org/doi/abs/10.1145/3583781.3590272, 6 pages.

(Continued)

*Primary Examiner* — Sakinah White Taylor
(74) *Attorney, Agent, or Firm* — Blank Rome LLP

(57) ABSTRACT

A hardware framework for cyber-deception operations provides flexibility in formulating counterattacks and leverages hardware support for efficiency. Hardware-assisted deception primitives are provided at kernel crossing boundaries to privileged system features that propel the security defenses to dynamically manipulate the malware execution and present a deceptive view of the system state to the attackers. Malware may be in the form of various attack vectors including ransomware, infostealers, buffer overflow, and side-channels.

15 Claims, 8 Drawing Sheets

(56) References Cited

U.S. PATENT DOCUMENTS

| | | | |
|---|---|---|---|
| 2014/0250524 A1* | 9/2014 | Meyers | G06F 21/554 |
| | | | 726/22 |
| 2018/0041536 A1* | 2/2018 | Berlin | H04L 63/1416 |
| 2019/0166098 A1* | 5/2019 | Trama | H04L 63/1408 |
| 2019/0384692 A1* | 12/2019 | Liu | G06F 11/3636 |
| 2021/0089647 A1* | 3/2021 | Suwad | G06F 21/552 |
| 2023/0221986 A1* | 7/2023 | O'Connell | G06F 9/466 |
| | | | 711/154 |
| 2025/0030733 A1 | 1/2025 | Kahlhofer et al. | |
| 2025/0039236 A1 | 1/2025 | Ignatius et al. | |

OTHER PUBLICATIONS

P. Derasari et al., "MAYALOK: A Cyber-Deception Hardware Using Runtime Instruction Infusion", 2023 IEEE 34th International Conference on Application-specific Systems, Architectures and Processors (ASAP), pp. 33-40, https://ieeexplore.ieee.org/abstract/document/10265704, 8 pages.

P. Derasari et al., "MAYA: Hardware Enhanced Customizable Defenses at the User-Kernel Interface", 2024 International Symposium on Secure and Private Execution Environment Design (SEED), pp. 50-61, https://ieeexplore.ieee.org/abstract/document/10738360, 12 pages.

P. Derasari et al., "EPIC: Efficient and Proactive Instruction-Level Cyberdefense", GLSVLSI '24, Jun. 12-14, 2024, Clearwater, FL, USA, pp. 407-414, https://dl.acm.org/doi/abs/10.1145/3649476.3658749, 7 pages.

M. S. I. Sajid et al., "SODA: A System for Cyber Deception Orchestration and Automation", ACSAC '21, Dec. 6- 10, 2021, Virtual Event, USA, pp. 675-689, https://dl.acm.org/doi/abs/10.1145/3485832.3485918, 15 pages.

A. Aly et al., "Real-time multi-class threat detection and adaptive deception in Kubernetes environments", Nature Portfolio, Scientific Reports, 158924, 2025, https://www.nature.com/articles/s41598-025-91606-8, 14 pages.

M. Couillard et al., "DRACO: Production Network Deployment and Evaluation of Deceptive Defense As-a-Service", 2024 IEEE International Conference on Big Data (Big Data), pp. 2606-2615, https://ieeexplore.ieee.org/abstract/document/10825309, 10 pages.

L. Sharma et al., "RISC-V Based Secure Processor Architecture for Return Address Protection", 2025 38th International Conference on VLSI Design and 2025 24th International Conference on Embedded Systems (VLSID), pp. 481-486, https://ieeexplore.ieee.org/abstract/document/10900683, 6 pages.

Y. Song et al., "Interstellar: Fully Partitioned and Efficient Security Monitoring Hardware Near a Processor Core for Protecting Systems against Attacks on Privileged Software," CCS '24, Oct. 14-18, 2024, Salt Lake City, UT, USA, pp. 198-212, https://dl.acm.org/doi/abs/10.1145/3658644.3690247, 15 pages.

J-S. Huang et al., "Time Machine: An Efficient and Backend-Migratable Architecture for Defending Against Ransomware in the Hypervisor", CCSW'24, Oct. 14-18, 2024, Salt Lake City, UT, USA., pp. 66-79, https://dl.acm.org/doi/abs/10.1145/3689938.3694780, 15 pages.

* cited by examiner

500

| Syscall Number | Number of | Deception Primitive | Target Field | Mode | Honey Resource Specifier |
|---|---|---|---|---|---|
| <sys_num> | <num_entries> | REPLACE_ENTER REPLACE_RETURN SCRAMBLE_RETURN | <target_location> | DIRECT | <honey_value> |
| | | | | INDIRECT | <quiver_base_addr, quiver_stride, max_bytes> |
| | | | | REG | <reg_name> |
| | | | | INDIRECT_REG | <quiver_base_addr, quiver_stride, max_bytes, |

*FIG. 2*

TABLE II: MAYA Defenses on Malware Categories

| Malware Family | Attack Category | Deception Strategies | Deception Targets | MAYA Primitives | Defense Outcomes |
|---|---|---|---|---|---|
| WannaCrypt0r | Ransomware | Diversion Exhaustion | Openat.write | REPLACE_ENTER | Files Protected |
| Infostealer | Credential Stealer | Fabrication | Read sendto | SCRAMBLE_RETURN, REPLACE_ENTER | Credentials Protected |
| Petya | Ransomware | Diversion Exhaustion | Connect. Unlink | REPLACE_ENTER | Files Protected |
| Return To-Libc | Buffer Overflow | Fabrication | Execve | REPLACE_ENTER | Pointer Protected |
| RSA Timing Attack | Timing Side-Channel | Exhaustion | Clock_gettime | REPLACE_ENTER | Keys Protected |
| Bad Rabbit | Ransomware | Fabrication, Diversion | Stat | REPLACE_RETURN, REPLACE_RETURN | Directories Protected |

FIG. 3

TABLE III: Execution latency in CPU cycles for syscalls (* denotes tactics that use RDRAND instruction [24])

| Syscall Name | MAYA Tactics | Deception Strategies | MAYA Subroutines | API Hooks |
|---|---|---|---|---|
| Openat | REPLACE_ENTER | Diversion | 53* | 1395* |
| Stat | REPLACE_RETURN | Fabrication | 25 | 518 |
| Connect | REPLACE_ENTER | Diversion | 53* | 526* |
| Read | SCRAMBLE_RETURN | Fabrication | 269* | 1966* |
| Sendto | REPLACE_ENTER | Fabrication | 60* | 601* |
| Clock_gettime | REPLACE_RETURN | Exhaustion | 27 | 491 |

FIG. 4

MAYA: A HARDWARE-BASED CYBER-DECEPTION FRAMEWORK TO COMBAT MALWARE

RELATED APPLICATION(S)

The present application claims priority to U.S. Provisional Patent Application No. 63/309,833, filed Feb. 14, 2022, which is hereby incorporated by reference in its entirety.

STATEMENT REGARDING FEDERALLY SPONSORED RESEARCH OR DEVELOPMENT

This invention was made with government support under N00014-21-1-2520 awarded by Office of Naval Research. The government has certain rights in the invention.

BACKGROUND

Cybersecurity attacks on industrial operations have been steadily rising in the past few years. To safeguard the computing systems, popular defense strategies typically rely on either detect-and-defend type solutions or system security-hardening strategies. Despite the successes of these prior solutions against many attacks, it is still difficult to accurately predict the threat vectors ahead in time, and act against the adversaries to effectively protect the critical system assets. This is evident from the unabated news about cybersecurity attacks in many affected domains, including manufacturing units, financial markets, and healthcare to name a few.

Cyber-deception is a proactive defense that not only traps the malicious actors but also creates an illusion of successful system penetration for the attackers to continue their operations, thereby creating opportunities for the system security architects to learn about adversarial targets and behavior. This strategy can provide rich information toward threat intelligence, decrease the attacker footprint by proactively catching them, and create forensics for formulating better defense procedures during cyberattacks. Prior studies have shown its strong potential for future-generation system security even in Zero-Trust architectures.

Active deception-based defenses continue to be embraced to guard several mission-critical systems already. Despite their growing popularity in the commercial market, current cyber-deception frameworks largely rely on hooking the software APIs and instrumenting the applications significantly to trap an attacker and supply counterfeit information using specialized honeypots. Often times, sophisticated attackers use probing techniques to analyze their execution environments. As such, software-based solutions may lead to botched defenses since they require non-trivial modifications to system implementation and create noticeable changes to the application's runtime execution profiles, thereby providing plenty of opportunities for malware to analyze the defenders more easily.

SUMMARY

In at least one embodiment a framework for cyber-deception operations provides flexibility in formulating counterattacks and leverages hardware support for efficiency. Hardware-assisted deception primitives are provided at kernel crossing boundaries to privileged system features that propel the security defenses to dynamically manipulate the malware execution and present a deceptive view of the system state to the attackers. Malware may be in the form of various attack vectors including, but not limited to, ransomware, infostealers, buffer overflow, and side-channels. In some embodiments, the disclosed framework can effectively help defend against these various attack types and protect valuable information, while incurring very a low performance impact. Additionally, efficient hardware support can improve the defense effectiveness of a computing system by being transparent, or invisible, to the attacker and by having the ability to evade malware's analysis through activating its counter-offenses stealthily at runtime.

BRIEF DESCRIPTION OF THE DRAWINGS

For a detailed description of various examples, reference will now be made to the accompanying drawings.

FIG. 2 illustrates a table of exemplary deception tactic specifications for deception table entries in accordance with one or more embodiments of the disclosure.

FIG. 3 illustrates a table of exemplary defenses on various malware categories in accordance with one or more embodiments of the disclosure.

FIG. 4 illustrates a table of exemplary latency in CPU cycles for system calls (syscalls) in accordance with one or more embodiments of the disclosure.

DETAILED DESCRIPTION

Figure 1A:
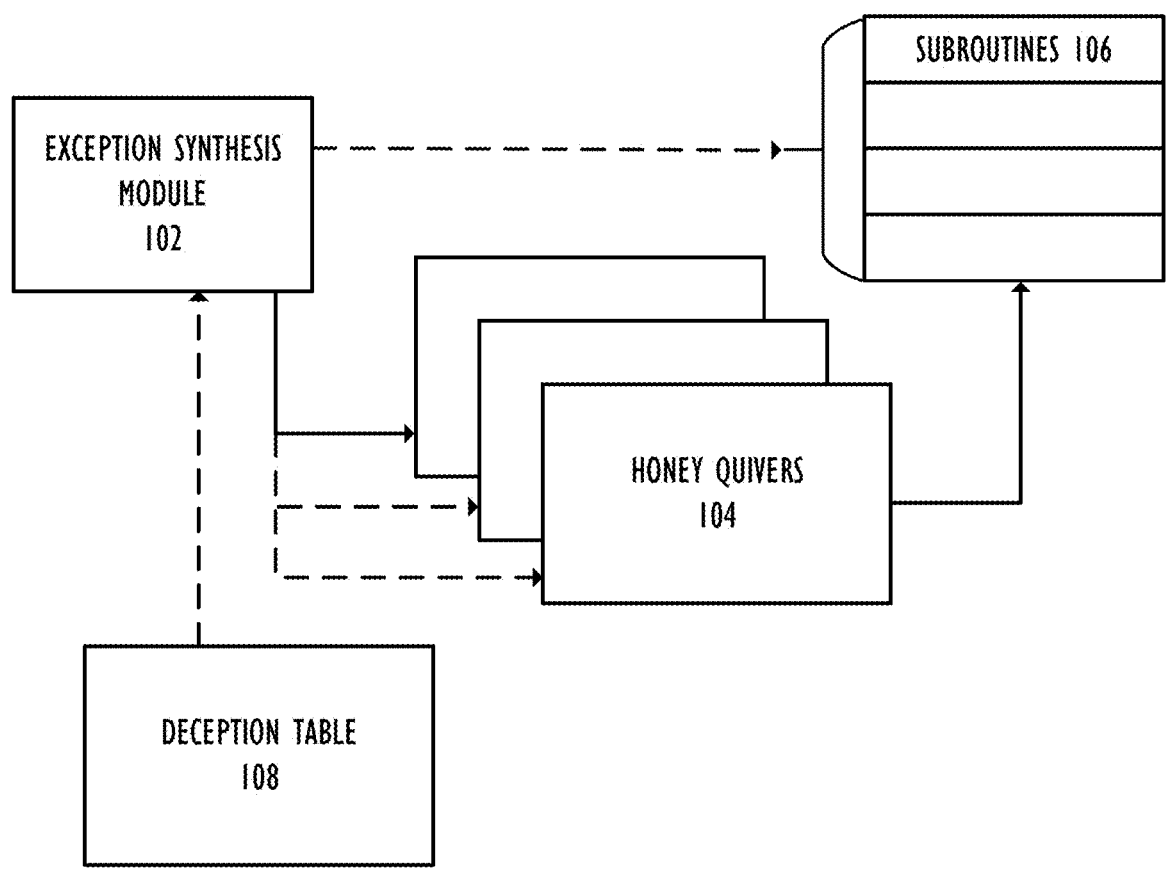
FIGS. 1A and 1B illustrate an exemplary diagram showing an exemplary network design in accordance with one or more embodiments of the disclosure.

Rapid rise in the incidence of malware attacks has added significant costs to cyber operations across several industry domains. As the adversaries evolve, defenses are effective when they not only prevent the malicious actors from reaching their targets, but also provide an opportunity to study their operational tactics. Cyber-deception is an evolving defense paradigm in computer security that renders the unique advantage to gather threat intelligence and cyber forensics about adversarial behavior, while actively defending the computing systems by either manipulating the malware program execution flow to non-useful states or through misrepresentation of critical system data.

In some embodiments of the disclosed technology, technical improvements to network-based cyber-deception techniques for computer system defense and hardware security are provided. The disclosed technology provides a framework for cyber-deception operations that offers flexibility in formulating counterattacks and leverages hardware support for efficiency. For example, the framework provides hardware-assisted deception primitives at kernel crossing boundaries to privileged system features that propel the security defenses to dynamically manipulate the malware execution and present a deceptive view of the system state to the attackers. Malware may be categorized into various attack vectors including, but not limited to, ransomware, infostealers, buffer overflow, and side-channels. In some embodiments, the disclosed framework may effectively help defend against these various attack types and protect valuable information, while incurring very a low performance impact.

In pursuit of effective cyber-deception frameworks that can remain transparent to the attackers, the processor hardware offers certain unique advantages. For example, hardware can deploy deception dynamically, reducing the lead time made available to the adversaries to react and re-calibrate their offenses. Additionally, hardware-based deception results in a near-native execution profile of the executing malware, thus causing a low-performance impact and avoiding any noticeable changes to the system environment that may provoke an attacker.

In one example embodiment of the disclosure, a cyber-deception architecture may be embodied either as an ASIC module or hardware integrated with one or more processors as described herein. While re-design costs and complexity may need to be factored with such an effort, another example embodiment (albeit, performance-wise expensive) option is realizing all of this as a standalone FPGA module attached to pre-process the instructions held in the instruction fetch unit, that does instruction insertion in the Instruction-cache (similar to how dynamic binary instrumentation tools may operate in software) and let the CPU carry on its instruction execution as it normally would.

Another example demonstrates how the cyber-deception architecture seamlessly switches the name of a file to be opened by the monitored program (e.g., malware) by modifying the relevant hardware register succeeding a call to the fopen library function. In this example, a malicious program is trying to open a file named "social_security.txt" that holds the social security number (SSN) of the victim and subsequently encrypt its contents. Hardware deception may be accomplished in one or more of the following ways including, but not limited to, inserting deception-related instructions dynamically using deception trigger logic, skipping the execution of certain instructions or changing their attributes, or intercepting system calls and altering their functionality during malware runtime.

The register allocation hardware logic is responsible for capturing the target registers of interest and allocating the same to the deception instructions during runtime. For example, if the value "social_security.txt" is held in register R1, the inserted deception instruction to overwrite R1 has to know that it has to target R1 to replace its value. The deception template will simply hold MOV "fake_social_security.txt"→<target_reg>. The Register allocation logic is responsible for filling in the <target_reg> with R1 at runtime.

In some embodiments, the instruction decoder-based hardware deception operation is not limited to just insertion of instructions, but can extend to deleting (skipping execution) or changing instruction attributes as well (without explicitly inserting new instructions).

Additionally, or alternatively, deception may be done in various other microarchitecture units, including hardware caches and their controllers (that can falsify values loaded from memory), execution logic (that can alter the values of memory addresses computed at runtime or that of data) and register writeback/commit unit that can alter/avoid updating registers when instructions complete their execution in the processor pipeline. Further, more robust reinforcement learning strategies may control the deception trigger logic to calibrate adversary's information gain function to play the deception game better without spooking the adversary.

In one embodiment of the disclosed technology, a hardware framework for cyber-deception that supports primitives offering flexibility to formulate a wide variety of deception tactics against cybersecurity attacks is provided. Deception tactics may be provided as input, such as by a system administrator using a programmable deception table. Deception tactics may counter malware during their kernel boundary crossings, and are transparent to the application. In some embodiments, the hardware framework builds on hardware-supported exception handling mechanisms and enforces its deception actions when the hardware is about to retire the system-call ("syscall") and system-return ("sysret") instructions that serve to delineate the kernel crossings. The deception primitives may be incorporated at these boundaries to intercept the malware's system service requests and to enforce deception tactics using hardware support and low-overhead exception handlers. To successfully carry out their attacks, almost all malware types utilize system calls. System calls, or syscalls, may include, but are not limited to, filesystem accesses, send/receive data from the networks, or the like. The hardware framework disclosed herein may be designed to transparently manipulate these system calls dynamically using hardware support and provide an effective framework for cyber-deception against malware.

At least one technological improvements and advantage of the disclosed hardware framework includes a flexible hardware-based cyber-deception framework to prevent adversaries from obtaining sensitive information or access to the system assets. The hardware framework provides a hardware-based deception architecture that transparently modifies the access to privileged features (e.g., system calls) during program runtime, thereby crippling an adversary's ability to adapt to the framework's counter-offensive tactics on malware.

In at least one embodiment, key hardware primitives present an altered view of a program state to an adversary during its operation. Primitives of the disclosed hardware framework are building blocks for deception and may be used to create deception tactics based on the system's security needs.

Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

Threat Model and Assumptions

Threat models include, but are not limited to, memory corruption and information stealing attacks. Notable examples of these attack classes include manipulating file storage, exploiting memory vulnerabilities in legacy programs to hijack their control-flow, stealing sensitive information, and timing side channels. Attackers usually employ malicious applications like ransomware, spyware (infostealers), or Remote Access Trojans (RATs) that entail executing malicious code on a victim system. Ransomware cannot successfully encrypt files without performing repetitive reads/writes on user files. Additionally, infostealers aim to transmit the stolen information using network calls.

One or more of the following assumptions may be made about an attacker: 1. They have sufficient privileges on the system to access and modify the directories and their files, 2. They can locate memory addresses inside the victim programs through address reverse mapping or disclosure vulnerabilities, and 3. They may measure the timing of specific code regions with reasonable accuracy. Such capabilities allow the adversaries to effectively intrude on the system using above-mentioned threat models, and even probe the presence of malware analysis modules (system defenders) to avoid from being detected. State-of-the-art techniques like DNN-based malware detection have reported over 97% accuracy in detecting malicious binaries at program load time. It may be assumed that a victim system is equipped with similar malware detectors to classify an unknown application's intentions (malicious vs. benign) with reasonably high accuracy. Once classified as malware, a system administrator can either naively purge the binary from the system (lost opportunity to learn about the malware) or allow it to execute on a cyber-deception framework described herein. The latter approach protects the system from damage and enlightens the defenders about the attacker's intent using the profile data collected during its runtime.

The Deception Framework

Figure 1B:
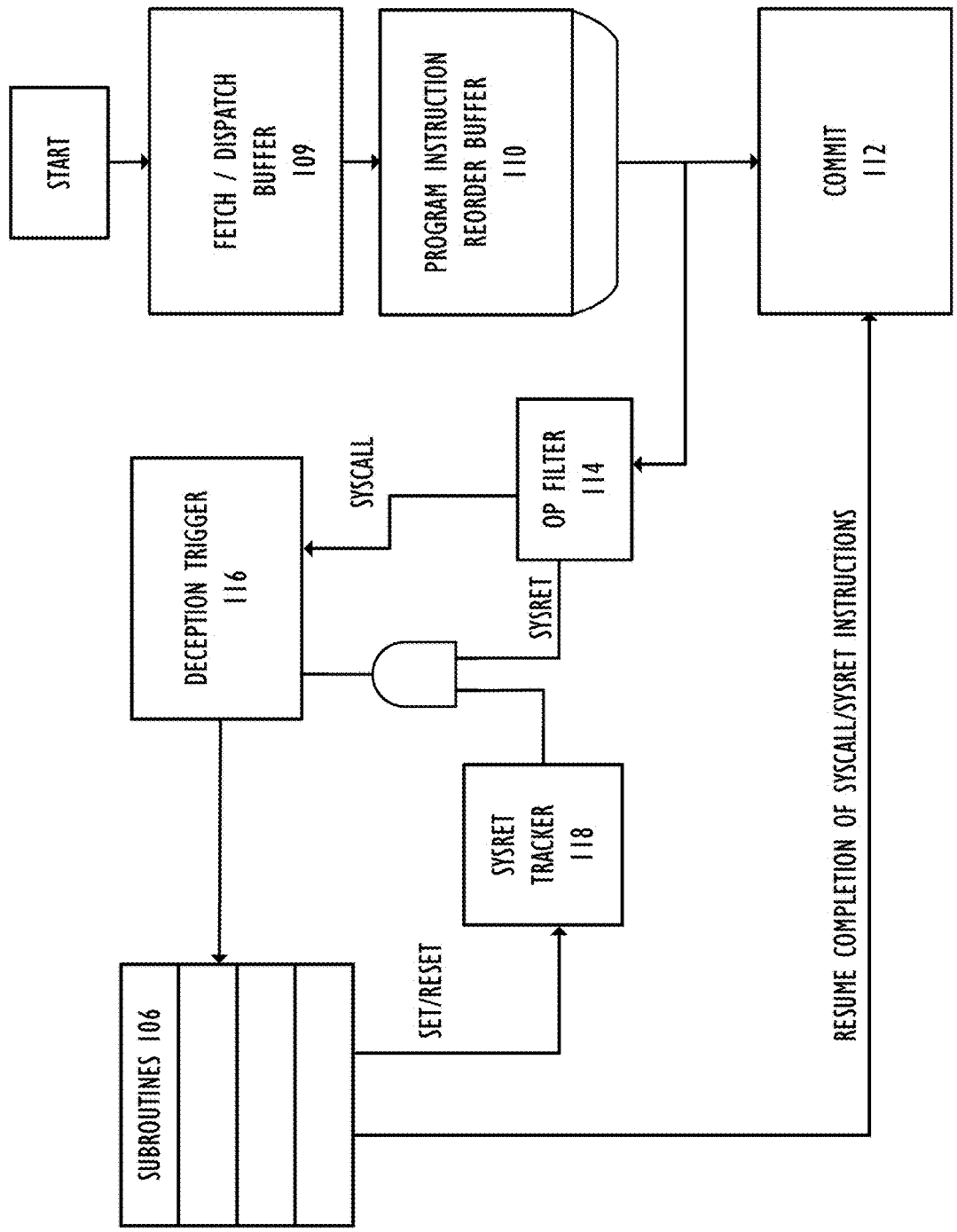

FIGS. 1A and 1B show an exemplary hardware framework for cyber-deception, including hardware design considerations and system-level support for deception tactics.

Cyber-deception may involve several strategies that lures away or stalls an adversary from gaining access to security sensitive system resources. This may include directing the adversary to a honey resource or honeypot (i.e., dummy resources meant to create an illusion that the attacker successfully reached its target) or draining adversary's resources when they seek access to sensitive assets. The disclosed framework significantly raises the cost of attack and ultimately reduces the value of information obtained by the mounted attack.

The deception strategies used by practical system defenders can be divided into three major categories, diversion, fabrication, and exhaustion. Diversion involves redirecting the attacker away from sensitive resources to honeypots. Fabrication entails misrepresenting certain sensitive information desired by the attacker, that could lead to changing their perception of the victim system. Exhaustion is achieved by pinning down the attacker and making them drain their performance after they strike a tripwire (usually a honey resource). The deception tactics supported by the system to enable the above strategies can allow its administrator to silently observe an adversary's actions while leading the malware to believe that their process is being faithfully executed.

In terms of operating mechanism, malware applications subvert system protection layers and attempt to invoke various system-level services like filesystem, process control, timers and network sockets/ports to achieve their intended functions. These services are typically supported by the Operating System via a system call interface that allows a user process to execute privileged tasks in kernel mode. The hardware framework disclosed herein taps these kernel crossing points to implement its cyber-deception tactics. In many Instruction Set Architectures (ISA), the kernel boundary crossing (system call and return) is delineated with specific instructions. For example, in the widely-used x86-based ISA, the syscall instruction invokes the System Call Handler module to execute the kernel code. The syscall type (number) is stored in the % rax register and its argument register allocation is done in the following order: % rdi, % rsi, % rdx, % r10, % r8, and % r9 depending on the number of inputs. Once the handler finishes execution of system code, control is returned to user code by executing a sysret instruction. Such well-defined interfaces provide for an efficient integration of the disclosed cyber-deception primitives into the processor hardware.

FIGS. 1A and 1B present an overview of a hardware cyber deception framework disclosed herein. Elements 102, 104, 106, 108, 114, 116, and 118 show structures that may be integrated into existing processors. Two main modules may be provided, such as Exception Routine 106, a vector of lightweight subroutines implemented as hardware-supported exceptions to transparently alter the CPU architectural state at the system call/return interfaces, and the Deception Trigger 116 hardware that serves to intercept the syscall and sysret instructions originating from malware code and invoke the appropriate exception subroutine to implement an effective deception strategy.

FIG. 1A illustrates a Pre-runtime Setup Module that enables the flexibility to populate the components used later by the hardware framework of FIG. 1B for runtime deception against given malware. The tactics can be specified in the Deception Table 108 either by a system administrator directly or through interface modules with automated deception strategy generators. The deception table entries are then used by a software-based Exception synthesis module 102 that can synthesize the following during program load time:
1. exception subroutines 106 (to be executed during system calls), and 2. Honey (resource) quivers 104, that act as a stash for supplying honey objects dynamically needed by the deception tactics. Honey quivers may be created prior to runtime. Additionally, or alternatively, honey quivers may be changed during runtime based, at least in part, on a deception tactic or deception strategy.

Exception Routine

The Exception Routine 106 invokes lightweight system call-specific subroutines needed for cyber-deception during kernel crossings. Deception Table 108 may contain a list of entries showing the deception primitives and modes (jointly referred to as 'tactics') for each syscall. The Exception Synthesis Module 102 may generate exception subroutines 106 based on the table entries during program load time, along with populating the Honey (Resource) Quivers 104 to supply one or more exception routines with the necessary honey objects at runtime.

Deception Table 108 is a structure that represents the key input for the disclosed hardware framework that specifies the administrator-desired tactics to be used against the adversary at kernel boundaries. FIG. 2 presents the format for different deception primitives supported by the disclosed hardware framework. Each syscall type (<sys_num>) may involve the use of multiple deception tactics specified by the <num_entries>. A tactic is composed of a combination of deception primitives and modes. Three exemplary deception primitives include:

REPLACE_ENTER: Replaces the contents of target field with a honey resource before completing syscall instruction;

REPLACE_RETURN: Replaces the contents of target field with a honey resource before completing sysret instruction; and SCRAMBLE_RETURN: Randomizes the contents of target field before completing sysret instruction.

Mode serves as the format specifier for the honey resource that ultimately modifies the target field (<target_location>) as part of deception. There are four modes of operation:

DIRECT: Overwrite the target field with honey_value.

INDIRECT: Modify the target field's contents with a random entry from a honey quiver. A valid honey re-source specifier entry is supplied through computing: quiver_base_addr+(rd_rand*quiver_stride) MOD (max_bytes/quiver_stride) where quiver stride denotes the size of a quiver entry in bytes, the total quiver size is max bytes, and rd rand is the result of a hardware random number generator supported in modern processors like the Intel RDRAND instruction (e.g., replacing the filepath argument in openat syscall with a randomly chosen dummy filepath pointer of length quiver stride bytes, from a honey quiver of size max bytes).

REG: Specifies the architectural register, reg_name, that provides additional information to the deception primitive (e.g., scrambling the buffer returned by read syscall, whose size is specified in the register, reg_name).

INDIRECT_REG: A combination mode where the quiver resource identifier calculation may need additional information from a syscall argument register. (e.g., replacing the buffer used by sendto syscall with a dummy buffer taken from a honey quiver supplying garbage values; the size of this dummy buffer is specified in an argument register).

Populating the entries in deception table 108 may be automated using deception strategy generators against specific malware types. Various combinations of deception primitives and modes may be used.

The exception synthesis module 102 may act as a code generator which translates the tactics from deception table entries 108 into exception subroutines 106. That is, the synthesis module 102 receives an input call signal, determines a detection on the input call signal based on the deception table 108 (e.g., a comparison), and selects a desired one of the subroutines 106 based on the determined deception. The synthesizer module 102 generates individual subroutines for each tactic that will modify the <target_location> with honey resource identifiers. For example, syscalls that require REPLACE_RETURN or SCRAMBLE_RETURN deception primitives, the framework may execute exception subroutines at the end of system call procedures. In such cases, the synthesis module 102 splits the corresponding deception tactic into two separate syscall entry and return-time subroutines. At runtime, the subroutine executed at syscall entry sets a hardware flag (Sysret Tracker) to trigger deception at the time of completing sysret instruction.

The synthesis module 102 may also populate the honey quivers 104 with a stash of dummy or fake resources that can effectively trick malware into continuing their execution. The honey quivers 104 may be individually synthesized for different purposes depending on the syscall arguments.

Path Quiver: Contains a stash of filepaths pointing to honey, such as files, directories, and executables that are scattered throughout the file system to assist with deception tactics.

Struct Quiver: Contains a stash of addresses to honey structs that may be used to assist deception tactics involving stat, clock_gettime and similar syscalls.

Garbage Quiver: Contains a stash of byte arrays with randomized values for use in deception tactics involving syscalls with buffers as arguments.

For INDIRECT and INDIRECT_REG deception modes, the synthesis module 102 inserts the appropriate honey quiver-related information like base address, stride, and max bytes into the associated exception subroutines.

After the pre-runtime setup process for the framework is complete, the hardware-assisted dynamic deception is activated against malicious processes during its execution. In terms of spotting malware applications for deception, at least two possibilities exist. In a first embodiment, assume conservatively that every externally developed (non-trusted) application is malware and let the framework perform deception until a privileged system monitor can carefully analyze the application behavior and deem its status as benign or not. In a second embodiment, during program load time, utilize zero-day malware detection frameworks to tag potentially malicious applications for deception. For example, DNN-based malware detection techniques use features like raw binary bytes at program load time to analyze an untrusted application.

Once the targeted process has been loaded for execution, trigger hardware serves to invoke the deception-related subroutines during its kernel crossings. The hardware framework may be integrated into the backend of a pipeline (e.g., 109/110) to minimize the changes needed in hardware. The deception hardware monitors the instructions flowing through the pipeline and creates traps for all syscall instructions associated with the targeted process. FIG. 1B shows an example processor pipeline depicting the flow of instructions from Instruction cache 109 to the Commit stage 112, where instructions complete their execution. In most modern processors, the instructions are fetched and decoded in program order until they reach the dispatch/issue stage. The ready-to-dispatch instructions are then sent to the reservation stations in an out-of-order manner into their respective execution lanes (based on the type of operation performed). These dispatched instructions are tracked using the Reorder Buffer (ROB) 110. When an exception or interrupt occurs, they are usually serviced during the commit stage 112 to support precise exception handling. Hardware exception handler mechanisms may be leveraged to realize deception hardware.

When a syscall instruction is marked completed and reaches the head of ROB 110, it normally gets tagged to raise an exception, which gets serviced after retiring the instructions older than the syscall instruction from ROB 110 and flushing younger instructions. The exception handler consults an Interrupt Descriptor Table (IDT) to transfer control over to the appropriate Interrupt Sub-Routine (ISR) for the system call. Deception trigger 116 may be implemented right before the system exception handler invokes an ISR.

The hardware framework may include an op-code filter (OP Filter) 114 that allows it to trigger deception. When completing syscall instructions, the Deception Trigger 116 reads the syscall type/number (usually stored in the % rax register in x86 architectures) and records this value in one of the reserved registers for future potential use during sysret execution. It then calls the Exception routine, which invokes the syscall specific subroutine indexed using a combination of syscall number and Sysret Tracker flag. For all syscalls, the default Sysret Tracker flag is '0'. If the deception primitive specifies return-time manipulation of target fields (REPLACE_RETURN, SCRAMBLE_RETURN), Sysret Tracker flag is set to '1' by the corresponding exception subroutine from subroutines 106.

For those syscalls that have multiple deception tactics, the framework may select a random exception subroutine among them that creates a state of confusion through perturbing the adversary's observation patterns between successive invocations of the syscall. To support this functionality, a hardware random number generator may be utilized to randomly index into one of the subroutines 106 when invoked by the deception framework. In some embodiments, the framework may trigger deception a random number of times for each syscall, each time with a randomly selected tactic (i.e., exception subroutine).

Once the exception subroutine related to a syscall completes, the hardware proceeds to execute the system exception handler. Since some deception tactics are designed to deliberately sabotage such system service invocations by the targeted process, the subsequent (originally requested) syscall results in an altered functionality not desired by the attacker. When the Commit stage 112 of the pipeline encounters a sysret instruction, the deception trigger is only invoked if the Sysret Tracker 118 was set earlier by the syscall instruction. The exception routine uses the (stored) syscall number and the sysret tracker value (i.e. '1') to index into the appropriate subroutine for return-time deception. For both syscall and sysret instructions, after servicing the framework's exception subroutines, the pipeline proceeds to retire the corresponding instructions in the processor pipeline.

FIG. 3 illustrates a table providing a summary of malware types used in one or more embodiments of the disclosed hardware framework. FIG. 3 provides exemplary malware families and their attack categories. It also shows exemplary Deception Strategies that may be formulated for different Deception Targets, i.e., the syscalls, and the Primitives used to achieve deception. Outcomes are provided that list the sensitive assets that would normally fall victim to the malware process but are protected by the disclosed cyber-deception framework.

FIG. 4 illustrates a table showing the latency (CPU clock cycles) for the disclosed hardware framework and API hooking, averaged over multiple runs. Some of the deception strategies use a random number generator (RNG) to select a random entry within the respective quivers for deception. In such cases, an additional 25 clock cycles may be included for the RDRAND instruction (marked with a * next to the latency values). The RDRAND latency is obtained from performance statistics reported by Intel's Digital Random Number Generator (DRNG). Hardware-supported deception offers an order of magnitude improvement in performance (7×–20×) compared to software-based API hooking techniques. The worst-case latency was observed in the read syscall (269 cycles) with a SCRAMBLE_RETURN tactic due to the repetitive writes required to overwrite each byte of the target buffer. Nonetheless, the clock cycle latency for the same to modify 16 bytes of data is 7× faster than its software counterpart. An average exception routine invoked by syscall handler can take hundreds to thousands of CPU cycles. Therefore, the disclosed hardware framework has a very low impact on runtime and remains transparent to the application. For example, a bad actor will not experience noticeable delay in having their malware code executed by the disclosed cyber-deception framework. In addition, the framework is transparent because it is implemented at runtime and not prior to runtime. For example, the deception strategy is implemented when the syscall, or more specifically, the syscall number, is received/read, and ends when the sysret is received/read.

Figure 5A:
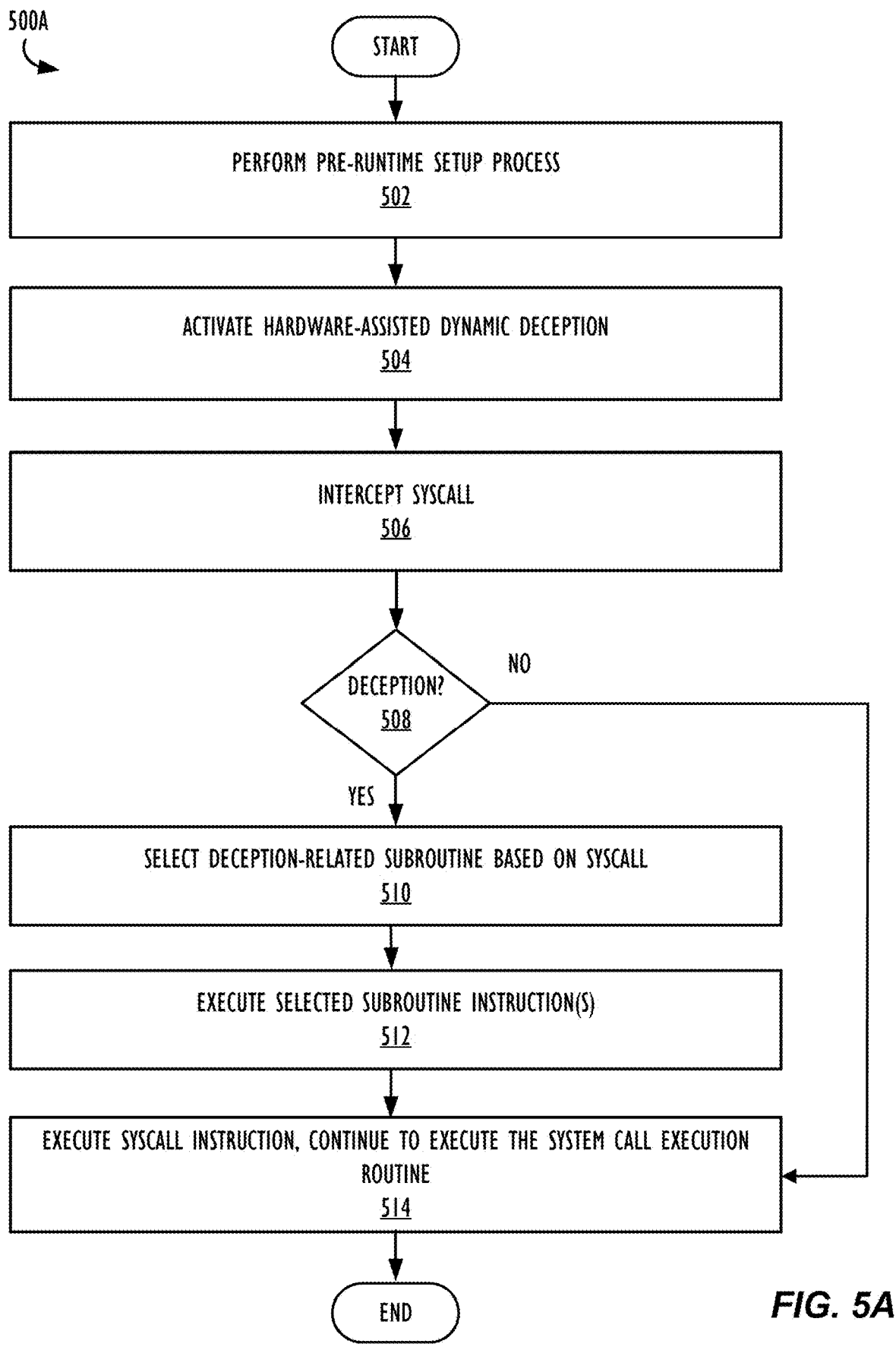
FIGS. 5A and 5B illustrate exemplary flow diagrams 500A and 500B in accordance with one or more embodiments of the disclosure.
Figure 5B:
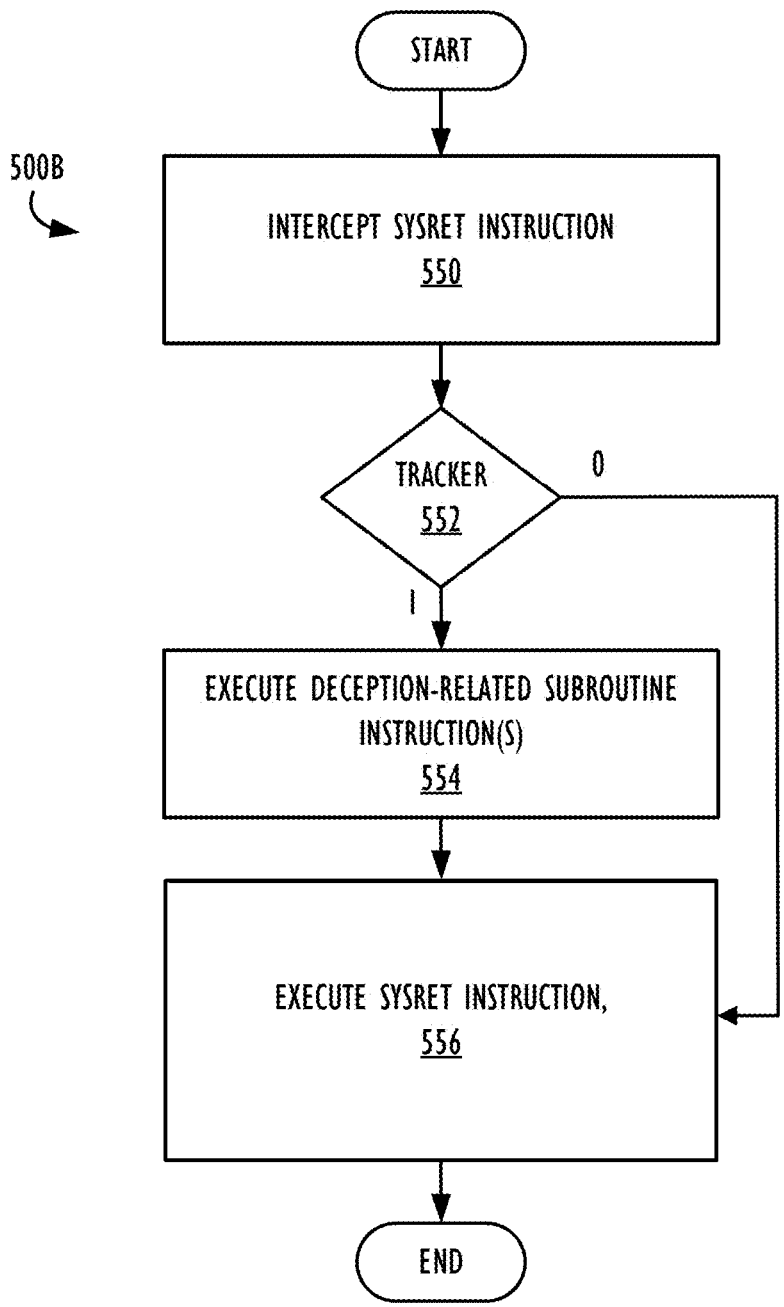

FIGS. 5A and 5B show, in flow chart form, an example method for cyber-deception tactic implementation, flow diagrams 500A and 500B, respectively. The method may be implemented by the disclosed hardware framework described above with respect to FIGS. 1A and 1B. For purposes of explanation, the following steps will be described in the context of FIGS. 1A and 1B. However, the various actions may be taken by alternate components, such as a processing device. In addition, the various actions may be performed in a different order. Further, some actions may be performed simultaneously, and some may not be required, or others may be added.

Flow chart 500A begins at step 502 with the implementation of a pre-runtime process. According to one or more embodiments, the pre-runtime process may be comprised of multiple steps described herein. Pre-runtime process 502 may include populating one or more components (e.g., tactics, strategies) to be used later against malware. Tactics may be created, such as by a system administrator, and stored in a table (e.g., Deception Table 108 of FIG. 1A). Based on the table of deception tactics, a plurality of subroutines (e.g., execution files) may be generated and stored in a database for subsequent retrieval (e.g., during runtime), such as in subroutines database 106. Subroutines may be generated by exception synthesis module 102, as described herein. Stored subroutines may include instructions to manipulate syscalls dynamically using hardware support. Each of the subroutines may be associated with one or more honey quivers, such as honey quivers 104, based on the corresponding deception tactic. In some embodiments, entries in the deception table may be automatically generated using a deception strategy generator against specific malware types.

The flow chart continues at 504 where hardware-assisted dynamic deception is activated against a malicious process. In some embodiments, the hardware-assisted dynamic deception is activated during execution of the malicious process. Deception may be activated against every externally developed (e.g., non-trusted) application, thereby assuming that every application is malware. This activation may be performed, for example, until a privileged system can carefully monitor application behavior. Additionally, or alternatively, deception may be activated when malware is detected during program load. For example, during program load time, a zero-day malware detection framework, or the like, may tag potentially malicious applications and cause deception to be activated. Additionally, or alternatively, malware may be detected by a filter at runtime, such as OP Filter 114 of FIG. 1B. Once activated, the deception process intercepts a syscall 506.

The flow chart continues at decision block 508, determining whether the intercepted syscall qualifies for cyber-deception. If the intercepted syscall does not qualify for cyber-deception (e.g., the intercepted syscall is not resulting from a malicious attack or part of malware), then the flow chart continues to 514 and the syscall is executed normally. Otherwise, if the intercepted syscall does qualify for cyber-deception in that it is part of or results from a malicious attack, then the flow chart continues to step 510.

The flow chart continues at 510 where the hardware-assisted dynamic deception selects at least one deception-related subroutine. A subroutine may be selected from subroutines database 106 based on characteristics of the syscall, such as a number (e.g., a unique integer) of the syscall assigned by the operating system. Deceptive subroutines may be indexed by syscall numbers. That is, the deception trigger unit 116 of FIG. 1B, for example, reads the syscall number in the syscall and selects the subroutine that is associated with that syscall number. For example, the subroutines may be indexed in subroutines table 106. In some embodiments, a syscall identified as malware may be associated with multiple deception tactics. When this occurs, a single deception tactic may be selected by using, for example, a random number generator. For example, a hardware random number generator may be utilized to randomly index into one of the subroutines associated with deception tactics. Deception strategies may include, but are not limited to, diversion, exhaustion, or fabrication. Subroutines may include, but are not limited to, instructions to protect files, credentials, or directories, using code primitives to implement deception (e.g., "REPLACE_ENTER" or "SCRAMBLE_RETURN").

The flow chart continues at 512 to execute the selected subroutine related to the syscall. Upon completion of the subroutine, the hardware-assisted dynamic deception executes the system exception handler. In some embodiments, a selected tactic may include a return-time deception (e.g., sysret). During execution of the selected deception routine, if the tactic includes a return-time deception, a sysret tracker flag may be set. For example, sysret tracker 118 may be set to "1". Deception tactics may be designed to deliberately sabotage system service invocations by the targeted process. The subsequent syscall, once executed, results in an altered functionality not desired by the malicious actor.

Referring now to FIG. 5B, flow diagram 500B illustrates an example where a syscall includes a companion sysret instruction. The flow diagram 500B starts by intercepting 550 a sysret instruction. The sysret instruction may be intercepted by OP Filter 114, for example. When tracker flag 552 is not set (e.g., flag is "0"), then there is no corresponding deception tactic and/or syscall (e.g., syscall originating from malware) and the sysret instruction is executed normally. The tracker flag may be stored in Sysret Tracker 118. Otherwise, when tracker flag 552 is set (e.g., flag is "1"), this indicates that the intercepted sysret corresponds to a syscall identified as malicious. The process would then continue to execute 554 the deception-related subroutine instruction(s), such as a subroutine of subroutines 106. Flow 500B would then move to execute 556 the sysret instruction. The exception subroutines may be executed as described herein with respect to syscall and sysret instructions. After completion of the exception subroutines, the process ends.

Figure 6:
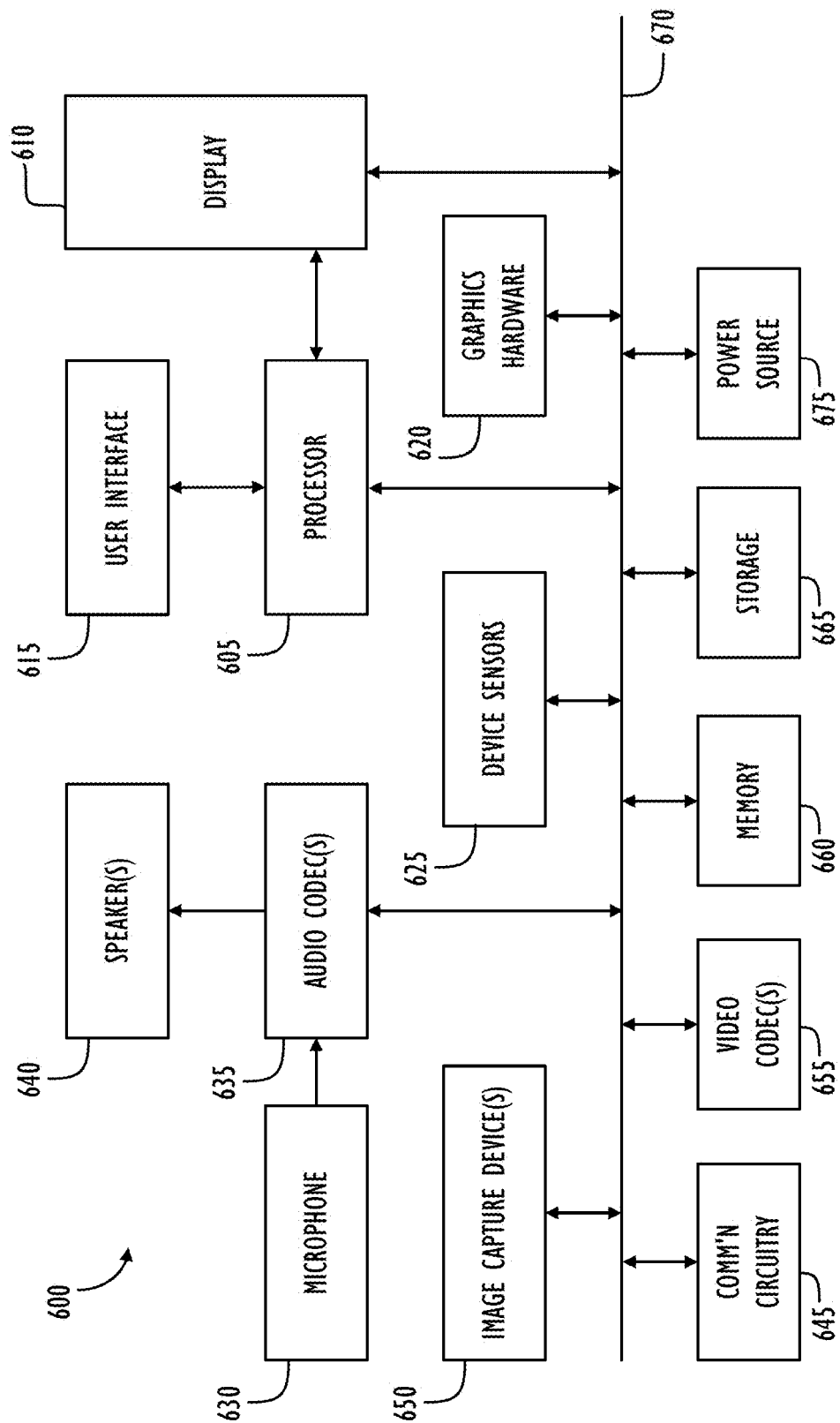
FIG. 6 illustrates an exemplary computing device in accordance with one or more embodiments of the disclosure.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system) video codec(s) 655 (e.g., in support of digital image capture unit), memory 660, storage device 665, and communications bus 670. Multifunction electronic device 600 may be, for example, a personal computer, laptop, or a personal electronic device such as a personal digital assistant (PDA), personal music player, mobile telephone, or a tablet computer.

Processor 605 may execute instructions necessary to carry out or control the operation of many functions performed by device 600 (e.g., the generation and/or processing of deception tactics or subroutines as disclosed herein). For instance, processor 605 may execute instructions including, but not limited to, exception synthesis module 102 or subroutines 106 of FIG. 1A, or elements of deception trigger 116 or OP Filter 114 of FIG. 1B. Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Deception tactics and subroutines may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

IMPLEMENTATION EXAMPLES

In the following examples, exemplary implementations of the disclosed technology is provided, each of which are non-limiting. The exemplary implementations are provided showing how to formulate deception tactics against six different malware families representing various attack types. Additionally, performance overheads of the hardware framework and its effectiveness with a comparison against software-based deception methods and Moving Target Defense techniques are provided.

Experimental Setup

For the examples, a x86 build of Gem5 version 22.0.0.2 is used. The hardware deception framework is built on top of the existing Gem5 DerivO3 CPU model, which is an out-of-order core based on the Alpha 21264 microprocessor. The system configuration model used in the exemplary implementations is listed in Table I below. All simulations are single process context run in the syscall emulation (SE) mode of Gem5.

TABLE I

| Gem5 simulator configuration | |
|---|---|
| Core Type | DerivO3CPU (Out-of-Order) |
| CPU Frequency | 2 GHz |
| Cache Line Size | 64 B |
| L1 Instruction Cache Size | 32 KB |
| L1 Data Cache Size | 64 KB |
| L2 Unified Cache Size | 2 MB |
| Memory Type | DDR4_2400_8 × 8 |
| Memory Size | 8 GB |

Security Analysis—Case Studies

Malware samples of the exemplary implementations represent some of the major cybersecurity attack vectors. The testbed consists of three ransomware, a buffer overflow attack, an infostealer, and a timing-based side-channel on the RSA cryptography algorithm.

A summary of malware types used in the security evaluation is shown in Table II, shown in FIG. 3. Table II presents the malware families and their attack categories. Table II also demonstrates the Deception Strategies that were formulated for different Deception Targets, i.e., the syscalls, and the Primitives used to achieve deception. Expected outcomes of the evaluation are provided under Defense Outcomes that list the sensitive assets that would normally fall victim to the malware process but are protected by the disclosed cyber-deception framework.

The following presents a detailed description of the exemplary implementations, suitable deception tactics, and how the disclosed framework implements them at runtime.

---

Malware 1 Ransomware (WannaCypt0r)

procedure GET_DIR_PATHS(dir_list)

for each dir_path in dir_list do encrypt_files(dir_path)

end for
end procedure
procedure ENCRYPT_FILES(dir_path)

for each file path in dir_path do fileptr ← openat(0, file path, O_RDWR, 0)

read(fileptr, buf, sizeof(buf))

buf ← encrypted buf
        write(fileptr, buf, sizeof(buf))

end for
end procedure

---

Ransomware—WannaCrypt0r: WannaCrypt0r is a part of the WannaCry ransomware family that uses a proprietary EternalBlue exploit to invade legacy computers and encrypt specific files in the victim system. Its evaluation sample targets a pre-defined list of directories, and then opens, reads, and overwrites all the files contained within them using ciphertext. A Diversion strategy is used that uses honey files from the path quiver as decoys to deceive the ransomware and safeguard the sensitive files.

Malware 1 illustrates the ransomware sample's operation and the deception target ("openat(0, file path, O_RDWR, 0) and "write(fileptr, buf, sizeof(buf))"). get_dir_paths( ) calls encrpt_files( ) for each di-rectory listed in dir_list. The encrypt_files( ) procedure recursively encrypts all files in a dir_path by opening and overwriting them with encrypted values. To perform deception using diversion, the openat syscall is targeted.

openat(int dfd, char *pathname, int flags, int mode) requires four arguments, of which the pathname points to a buffer in the process' memory that stores the directory path as a string of characters. The syscall procedure returns an integer value from the file descriptor table (FDT) if the file was opened without errors. The second argument to the syscall is stored in the % rsi register before the kernel handler is invoked. To perform diversion-based deception on this syscall, the exception subroutine targets the % rsi register and switches its value with the address of a honey file path. Accordingly, the deception table entry for openat syscall will be initialized with the following parameters: <257, 1, REPLACE_ENTER, % rsi, INDIRECT, <path_quiver_base, path_size, max_bytes>>.

During the application runtime, the syscall instruction for openat gets intercepted by the deception trigger hardware, which will invoke the exception subroutine. The indexing into the subroutine is done using its syscall number (257) and the Sysret Tracker value (0 by default). Based on the deception primitive and its mode of operation, the subroutine will replace the contents of % rsi—which, in this case, is a memory address pointing to the target sensitive directory with that of a random entry from the path honey quiver. The location of a valid random target entry may be calculated as follows:

honey_resource_$addr$=path_quiver_base+(path stride* $rd\ rand)MOD($ $max$_bytes/path stride)

Once the subroutine finishes execution, the hardware continues to service the openat syscall. When the kernel transfers control back to the malware process after servicing openat call, it will have opened the honey file instead of the targeted sensitive file.

Other Deception Strategies: Besides diversion, another deception strategy against this ransomware is targeting the write syscall. To disrupt the ransomware's encryption, an Exhaustion based deception strategy may be formulated such that the ransomware is never allowed to overwrite the victim files with encrypted values. The write syscall copies size number of bytes (pushed into % rsi for the syscall) from buf into the target fileptr. REPLACE_ENTER deception primitive in DIRECT mode may be used to replace the % rsi register value with a 0. This deception strategy exhausts the adversary's efforts by making it open, read, and encrypt a file's contents continually but never letting the writes reflect back into the filesystem.

Ransomware—Bad Rabbit: The Bad Rabbit ransomware family targets sensitive databases inside vulnerable corporate networks. Its evaluation kernel starts traversal from a target directory, creates a list of all paths within it, and then for all file paths, it opens, reads, and overwrites them with encrypted contents (e.g., using an AES-256-CBC algorithm), and finally renames the files with a custom extension. A Fabrication deception tactic may included using modifications to the path information yielded by a stat syscall.

Malware 2 below describes the ransomware's file path extraction and encryption using pseudocode. In this example, the list_paths( ) function adds all paths within the target_dir to a path_list and then calls the encrypt_files( ) procedure. A stat syscall is invoked for each path in the list, and if the path is a regular file (S ISREG(statbuf.st mode)) it is overwritten with the encrypted contents and then renamed with a ".blackcat" extension.

---

Malware 2 Ransomware (Bad Rabbit)

procedure LIST_PATHS(target_dir)

for each path in target_dir do path_list ← path
    end for
    encrypt_files(path_list)

end procedure
procedure ENCRYPT_FILES(path_list)

declare struct stat *statbuf for each path in path_list do
        stat(path, statbuf)

if S ISREG(statbuf.st_mode) then
            fileptr ← openat(0, path, O_RDWR, 0)

read, and overwrite path with encrypted contents
            rename(path, path.blackcat)

end if
    end for
end procedure

The stat(char *path, struct stat *statbuf) syscall fetches information about a file system entity like device ID, user ID, access mode, file type, file size, etc., and returns it into the statbuf structure. To present a false view of the target directory's contents, the file (path) type i.e., st_mode value in a statbuf structure is fabricated to show that a path is a sub-directory even if it is a file. Since the ransomware only operates on files (S ISREG(statbuf.st mode)), any damage to the user files may be avoided. The deception table entry to support the subroutine for such a fabrication tactic contains the following information to be translated into a subroutine: <4, 1, REPLACE_RETURN, offset[% rsi], DIRECT, <honey_value>>.

During ransomware execution, the syscall instruction corresponding to stat syscalls are trapped by the framework, and the syscall number (e.g., "4") is stored in a reserved register. The Deception Trigger calls the exception routine, which then invokes the exception subroutine corresponding to stat. Since the tactic involves a return-time deception, the Sysret Tracker flag is set. Subsequently, when executing the sysret instruction, the deception trigger logic invokes an exception subroutine that corresponds to the syscall number (4), previously stored in a reserved register at the time of syscall. The fabrication strategy for this ransomware deploys the REPLACE_RETURN primitive in DIRECT mode. The target location offset[% rsi] points to the st_mode field in the statbuf structure and is modified with the <honey_value>.

The honey_value is an integer input that changes the file type to a directory. On the account of direct modification, the ransomware will receive a falsified st_mode value once the sysret instruction reaches the commit stage and is retired from the pipeline.

Other Deception Strategies: Diversion may also be used on this ransomware with REPLACE_RETURN primitive in INDIRECT mode that will replace the statbuf structure pointer argument of the (stat) syscall with the pointer to a randomly selected honey entry from the statbuf struct quiver. The struct quivers, as described herein, hold fake structures such as stat, sockaddr, or timespec for their related syscalls. The honey resource specifier format is equivalent to the one described for Wannacry ransomware above. The honey resource identifier in the deception table may specify the base address of the statbuf struct quiver, stride being the size of each statbuf pointer, and max bytes equal to the total quiver size. By replacing the returned statbuf with a honey structure, the ransomware is redirected to honey files.

Ransomware—Petya: The Petya ransomware family targets a victim's Master Boot Record (MBR) and encrypts all files. Its evaluation sample generates a 256-bit key and sends it to the Command and Control (C&C) server using the IPv4 protocol. Each unencrypted file in the target directory is duplicated with a custom extension, and the original files are deleted after their contents are encrypted (using symmetric encryption) and stored in the ransomware-created duplicate files. This process is repeated until it observes complete encryption of previously missed or newly added files. A diversion deception strategy is provided that can redirect the network connection to one of the honey servers.

Malware 3 shows the key generation and transmission functionality within the generate_and_send_key( ) procedure. After generating a random key of key_len bytes, the ransomware initializes a sockaddr structure with the C&C server's IP address. It creates an AF_INET type socket file descriptor, sockfd, and then establishes the ransomware payload's connection to a remote C&C server using a connect syscall. Upon a successful connection, it sends the encryption key and then begins encrypting the files of a target_dir. A diversion-based deception is shown at the connect system call to intercept the encryption key from the ransomware and use it for decryption.

In this example, the connect(int sockfd, struct sockaddr *saddr, int addrlen) syscall creates a connection to the open socket identified by sockfd according to the parameters defined in the sa_family and sa_data fields of the sockaddr structure. For successful redirection to a honey server, the pointer to the attacker's sockaddr structure is replaced with a honey sockaddr structure from the struct quiver. The subroutine for this tactic may be generated using the following deception table entry: <42, 1, REPLACE_ENTER, % rsi, INDIRECT, <struct_quiver_base, sockaddr_size, max_bytes>>

| Malware 3 Ransomware (Petya) |
| --- |
| initialize key_len ← 256 |
| initialize sruct sockaddr *saddr ← C&C IP address |
| procedure GENERATE_AND_SEND_KEY |
|     key[key_len] ← random alphanumeric values |
|     sockfd ← socket(AF_INET, SOCK_STREAM, 0) |
|     connect(sockfd, saddr, addrlen) |
|     sendto(sockfd, key, key_len, saddr, addrlen) |
|     encrypt_files(key) |
| end procedure |
| procedure ENCRYPT_FILES(key) |
|     for each file in target dir do |
|         if not file.encrypted then |
|             fileptr ← open file |
|             read(fileptr, buf, sizeof(buf)) |
|             buf ← buf encrypted with key |
|             encfileptr ← create file.encrypted |
|             write(encfileptr, buf, sizeof(buf)) |
|             unlink(file) |
|         end if |
|     end for |
|     for each file in target_dir do |
|         if not all file.encrypted then |
|             encrypt_files(key) |
|         end if |
|     end for |
| end procedure |

During the malware execution, the syscall instructions corresponding to connect will direct the deception trigger to index into the exception routine using the syscall number, 42. The target location to be replaced is stored in the % rsi register, which in turn points to the C&C server's information as a sockaddr structure. The deception tactic selects a random honey server's configurations from the socketaddr struct quiver with the base address of the quiver, the size of a sockaddr struct pointer as stride, and the max bytes value, which is a product of the number of honey sockaddr struct addresses and stride value.

The deception tactic uses a REPLACE_ENTER primitive in INDIRECT mode, the Sysret Tracker will not be set for any return time exceptions, and the target location is replaced with a pointer to the randomly chosen honey sockaddr struct address. Upon completion, the connect syscall will have created a connection between the ransomware and the honey server. Eventually, the ransomware sends the encryption keys via a sendto syscall to the C&C server, which is now going to be intercepted by a honey server without raising any alarms for the ransomware payload.

Other Deception Strategies: This ransomware family may also be deceived using Exhaustion inside the file encryption procedure, encrypt_files( ). The deception tactic with REPLACE_ENTER primitive can modify the file argument of each unlink syscall to honey files in INDIRECT mode of deception. The honey files are selected from the honey path quiver, where the honey resource specifier fields are similar to our prior case studies. The ransomware will not be able to remove the original unencrypted files from a target directory, thus trapping it in an infinite loop of re-encryption as it keeps checking for any remaining unencrypted files as shown in Malware 3.

---

Malware 4 Buffer Overflow (Return-to-Libc)

procedure PERFORM_ATTACK
  declare buffer[len]
  initialize stack_func_ptr ← &dummy_function()
  target_addr - &stack_func_ptr
  overflow_ptr ← &execve()
  size ← target_addr - buffer + 8
  payload ← ['A' * (size - S)] + overflow_ptr
  memcpy(buffer, payload, size)
  call stack_func_ptr("/bin/sh")
end procedure

---

Buffer Overflow—Return-to-Libc: The RIPE buffer overflow benchmark suite may be used to evaluate a return-to-libc attack. The application invokes the execve syscall to launch an unauthorized command. In this example, the attacker spawns a shell ("/bin/sh") in privileged mode to execute arbitrary commands. A test sample may be built according to RIPE's configuration directives that allow a vulnerable code to perform buffer overflow. The resulting sample tries to overwrite a function pointer located on the stack by abusing the lack of boundary checks within a memcpy( ) function, which allows the attacker to move contents at the destination buffer. A Fabrication deception strategy may be formulated that can thwart this adversary by switching the privileged shell's executable path with a honey executable which starts an interactive shell with limited privileges.

From the buffer overflow example in Malware 4 it can be seen that the sample misuses the memcpy( ) function to overflow the buffer such that it writes the execve syscall's address to the stack_func_ptr function pointer. The sample then calls stack_func_ptr("/bin/sh") to spawn a shell using the execve syscall.

In this example, execve(char *pathname, char *const argv[ ], char *const envp[ ]) replaces the caller application with a program referred to by pathname. argv[ ] points to an array of strings passed to the new program as its command-line arguments, and envp[ ] points to an array of strings passed to the environment of the new program. To perform fabrication, the pathname may be replaced with a honey executable from the path honey quiver. The deception table entry for execve may be initialized with the following parameters: <59, 1, REPLACE_ENTER, % rsi, INDIRECT, <path_quiver_base, path_size, max_bytes>>

The similarity in deception table entries for the many tactics that modify the pathname (e.g., files, directories, and executables) can be leveraged to reduce the burden of hardware deception framework's exception synthesis module in creating the corresponding subroutines. The runtime deception trigger sequence, along with the honey resource identifier computation, is similar to the one described in prior examples except the syscall number used for indexing is 59. The subroutine for execve may use the REPLACE_ENTER primitive in INDIRECT mode to switch the target field % rsi with the address of a randomly picked honey executable before the syscall instruction is serviced by the kernel. The execve system call procedure replaces the caller process with the honey executable, which in turn spawns a fake shell with limited privileges. The type of fake shell, its privilege level and executable paths may be decided offline by a system administrator.

---

Malware 5 Credential Stealer (Infostealer)

declare buf
declare buf_len
initialize browser_passwd ← "path/to/password/file"
initialize struct sockaddr * saddr ← C&C IP address
sockfd ← socket(AF_INET, SOCK_STREAM, 0)
connect(sockfd, saddr, sizeof(saddr))
if browser_passwd exists then
  fileptr ← openat(browser_passwd, O_RDONLY)
  do
    buf_len ← lseek(fileptr, 0, SEEK_HOLE)
    read(fileptr, buf, buf_len)
    sendto(sockfd, buf, buf_len, saddr, sizeof(saddr))
  while fileptr reaches end of browser_passwd
end if

---

Infostealer—Credential Stealer: In this example, the Credential Stealer malware from the infostealer family is provided. This malware infiltrates a victim system and exfiltrates important user credentials such as, for example, passwords, browser cookies, history, and encryption keys. Prior works, such as DodgeTron have established HoneyThings (e.g., honey files, honey registries, honey configurations) to misinform infostealers as an effective deception scheme.

The infostealer sample used in this example targets browser password files stored at predetermined locations inside victim systems. This stealer confirms the presence of the password file, reads all the information, and then sends it to a C&C server. To counter this malware, a Fabrication based deception may be formulated. The aim is to misrepresent credential data from sensitive files when requested by the malware. Using Malware 5, the application establishes a connection with the C&C server, opens the browser_passwd file that stores the user's passwords on the system, reads the passwords and sends them to the adversary with repetitive read and sendto syscalls until it reaches the end of the file. The deception strategy in this example targets the buffer (buf) populated by the kernel after returning from the read syscall. For example, read(int fd, char *buf, size_t count) fetches count number of bytes from an open file with the file descriptor fd into the memory location pointed to by buf. The values returned into buf may be falsified by writing garbage values into the bytes. This creates misinformation about the victim for the malicious process and, in turn, the remote attacker. The following deception entries are required to formulate the subroutine for this tactic: <0, 1, SCRAMBLE_RETURN, [% rsi], REG, % rdx For every invocation of the read syscall instruction, the deception trigger invokes the appropriate subroutine indexed with the syscall number 0. Since this is a _RETURN type deception primitive, the subroutine enables the Sysret Tracker flag for deception. The deception trigger invokes another exception subroutine for this syscall before the sysret instruction retires from the pipeline.

The contents pointed to by the target location, [% rsi] register, are modified using the SCRAMBLE_RETURN primitive, which randomizes each byte value in REG mode of operation. The honey resource specifier indicates that % rdx contains some relevant information for the deception tactic, which for a read syscall specifies the number of bytes to scramble starting from [% rsi]. The scrambling mechanism is a loop that iterates based on the value held in % rdx register (buffer size). Once the memory operations are completed by the subroutine, the sysret instruction can commit and retire hence reflecting the deception-related modifications in the buffer. As a result, when the malware process invokes a sendto syscall, it transmits the scrambled buffer (password) to the attacker. This fabrication operation repeats for all passwords read from browser_passwd until the malware reaches completion.

Other Deception Strategies: In this malware, a Fabrication strategy may be deployed for the sendto syscall using the REPLACE_ENTER primitive in INDIRECT_REG mode. The target field for such a strategy is the % rsi register that stores a pointer to the buffer's (buf) memory location. Since it is an _ENTER type of deception, the exemplary exception subroutine is only executed for the syscall instruction. The honey resource specifier format stores <garbage_quiver_base, garbage_stride, max_bytes, % rdx> where the base address of the garbage quiver will be added to a random address calculated as: honey_resource_addr=garbage_quiver_base+ (garbage_stride*rd_rand) MOD (max_bytes−% rdx).

The quiver stride for a honey (garbage) quiver with char data is 1, and the % rdx register determines the range for picking the starting byte of honey buffer without going over the garbage quiver size. The subroutine for sendto switches the % rsi register from the buffer's memory to that of the honey_resource_address and is subsequently transmitted upon the syscall's completion. Similarly, for every sendto syscall procedure, a sequence of garbage values may be sent to the C&C server, thus realizing the fabrication strategy.

---

Malware 6 Timing Side-Channel (RSA Timing Attack)

d is the private decryption key
N is the product of two primes
C is the ciphertext to decrypt
struct timespec start, stop procedure MODULAR_EXPONENTIATION(d, C, N)

n ← size of d in bits
 x ← C
 j ← 1

-continued for each j less than n do
  clock_gettime(CLOCK_REALTIME, &start)
  $x \leftarrow x^2 \bmod N$
  if dj equals 1 then
   $x \leftarrow x * C \bmod N$
  end if
  j ← j + 1
  clock_gettime(CLOCK_REALTIME, &stop)
 end for
 time_diff secs ← stop.tv_secs - start.tv secs
 time_diff nsecs ← stop.tv nsecs - start.tv nsecs return x
end procedure

---

Timing Side-Channel—RSA Timing Attack: An RSA Timing Attack works by observing the timing difference caused by a compute-intensive modular exponentiation algorithm used to encrypt/decrypt a message with the respective public/private keys in an RSA-based encryption scheme. The algorithm uses two prime numbers p and q to compute N=p*q and selects two random exponents e and d that satisfy the condition e*d=1 mod (p−1)*(q−1). Then it uses a public key (e,N) to encrypt and a private key (d) to decrypt a message M. The encrypted message is stored in C=Me mod N, where C is the resulting ciphertext.

The side-channel (Malware 6) performs a modular exponentiation function that is needed to decrypt C using the binary value of private key d. The attack exploits a timing difference in the computation of M=Cd mod N due to the additional x=x*C mod N for each '1' bit of d. Whereas x=x2 mod N is the only computation done for '0' bits.

The attacker invokes the modular exponentiation operation for several carefully crafted ciphertexts, C. By timing this computation and analyzing the timing difference in each iteration, the attacker can retrieve the exponent value d bit-by-bit with fairly high accuracy. A user-level process in Linux™ can read the timer's value using the clock_gettime syscall (e.g., "clock_gettime (CLOCK_REALTIME, &start" and "clock_gettime (CLOCK_REALTIME, &stop)").

In this example, clock_gettime(clockid_t clockid, struct timespec*res) returns the current time in seconds (res.tv_sec) and nanoseconds (res.tv_nsec) relative to the starting epoch which is determined by the clockid argument. An Exhaustion deception strategy may be used where the timer values may be modified from the clock_getime syscall by adding a fixed offset for every successive syscall invocation. This prevents the attacker from extracting the actual timing differences corresponding to the key value. The deception table entry contains the following information to implement the strategy: <228, 1, REPLACE_RETURN, [% rsi], DIRECT, <honey_value>.

For all clock_gettime syscall instructions, the deception trigger resets the Sysret Tracker and finds the exception subroutine using its syscall number, 228 and Sysret Tracker value, 0. It stores the syscall number in a reserved register for return time usage and starts the deception tactic subroutine. Since this is a _RETURN type deception tactic, the subroutine sets the Sysret Tracker flag and lets the kernel handle the syscall. When the framework encounters a sysret instruction, it signals the trigger to lookup the subroutine indexed with <228, 1> and begins its execution.

The deception tactic for this subroutine uses the REPLACE_RETURN primitive in DIRECT mode to modify the target location i.e. the timespec struct pointed to by the [% rsi] register with the honey resource specifier, <honey_value>. At the first invocation of clock_time, the honey value is a fixed offset (preferably in nanoseconds) which is added to the timespec struct's tv_nsec and tv_sec fields. The subroutine then records the offset in a reserved physical register and updates the honey_value to store the resulting time in nanoseconds. For every subsequent invocation of clock_gettime( ) the deception tactic will replace the timer value with the honey_value+offset. As a result, when the malware calculates the timing difference, it will observe that the modular exponentiation takes a fixed time to execute for both '0' and '1' bits of the decryption key. Thus, the exhaustion strategy essentially negates the efforts of the attacker.

Performance Overhead Analysis

Exemplary experiments to analyze the performance overheads of the disclosed hardware deception framework are provided herein. In these examples, hardware modifications are provided using the Gem5 simulator and implemented subroutines as precise exceptions described above. For comparison, the performance of software deception based on Application Programming Interface (API) hooking is provided. Inline API hooking of the syscalls is performed to insert trampolines that use jump instructions to transfer control of the syscall over to hook procedures for deception. These hooks are intermediary functions invoked by the trampolines that parse and handle the syscall arguments before executing the actual syscall. Example implementations for comparison include API hooking on syscalls related to filesystem (openat, stat, read), networking (connect, sendto) and timer (clock_gettime) categories.

As shown in FIG. 4, Table III shows the latency (CPU clock cycles) for the disclosed framework (e.g., "MAYA subroutines") and API hooking (e.g., "API Hooks"), averaged over multiple runs. Some of the deception strategies needed a random number generator (RNG) to select a random entry within the respective quivers for deception. In such cases, an additional 25 clock cycles were included for the RDRAND instruction (marked with a * next to the latency values). The RDRAND latency was obtained from performance statistics reported by Intel's Digital Random Number Generator (DRNG).

Experimental results show that hardware-supported deception offers a magnitude improvement in performance (7×-20×) compared to software-based API hooking techniques. The worst-case latency was observed in the read syscall (269 cycles) with a SCRAMBLE_RETURN tactic due to the repetitive writes required to overwrite each byte of the target buffer. Nonetheless, the clock cycle latency for the same to modify 16 bytes of data is 7× faster than its software counterpart. It is known that an average exception routine invoked by a syscall handler can take hundreds to thousands of CPU cycles. Therefore, the disclosed hardware-based deception framework has a very low impact on runtime and remains transparent to the application.

Alternatively, Moving Target Defense (MTD) based defenses, such as Morpheus, use a combination of program value displacement (e.g., code, data, and pointers) and encryption along with a churn that re-randomizes the program values at frequent time intervals using hardware. The performance analysis reported on the RIPE buffer overflow benchmark showed an average of 13% in performance overhead for a continuous churn period on top of hardware implementation costs. For the same benchmark, the disclosed framework's REPLACE_ENTER primitive—that replaces the privileged shell's executable path with a honey executable—incurs negligible overhead due to targeted modification and invoking low-overhead exception subroutine with minimal hardware support compared to Morpheus, which needs to continuously displace and encrypt all of the code, data, and pointer values in hardware.

Effectiveness of the Deception Framework

The experimental results described herein show low latency and efficiency in achieving cyber-deception with minimal hardware support at the backend of the pipeline. This also demonstrates effectiveness for a defense strategy where stealth is paramount, without which the adversary may be alerted and may lead to a failed opportunity to profile its behavior. For example, an attacker employing timers during its operations may get suspicious when their process takes an unexpectedly long time to execute due to the presence of an API hooking mechanism. In contrast, the disclosed framework adds minimal latency (as low as 25 clock cycles) that would appear mostly as noise, especially in real system settings.

In another example, the execution traces of two prominent and destructive threats-ransomware, and credential stealers, may be considered. In this example, strace, a Linux™ command-line debugging tool, may be used to generate a sequence of unique syscalls for each attack type. A typical ransomware process invokes the following sequence of syscalls: getdents→openat→fstat→read→rename→write→close→unlink→socket→connect→sendto→shutdown to read a directory structure, encrypt all files, and then communicate (usually to send the encryption key) with the C&C server. In the case of credential stealers, an average exploit included a syscall sequence like uname→access→openat→read→socket→connect→sendto→close→shutdown to exfiltrate system information and/or contents of sensitive files.

The disclosed framework can engage a malicious process with low-overhead exception routines until the end of its execution. This presents an opportunity for a security monitor to observe the attacker's actions entirely (for the longest time) and formulate effective defenses against them. The disclosed framework has also shown how to extend an attacker's interaction with a honey server by targeting network-based syscalls like connect and sendto with low overhead exception subroutines. This can help system monitors to capture the adversarial communications with external entities in a manner that is transparent to the attacker.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A cyber-deception system comprising:
   a hardware processor is configured to:
      intercept a system call; and
      select at least one subroutine amongst a plurality of subroutines based on the intercepted system call;
      the hardware processor having a subroutine, wherein the subroutine is configured to implement, based on the system call, at least one deception strategy amongst a plurality of deception strategies, wherein the at least one deception strategy is implemented by executing one or more instructions of the selected at least one subroutine; and
   the hardware processor executes pre-runtime setup instructions to allow a system administrator to directly populate tactics into a deception table through a user interface, wherein the hardware processor further includes exception synthesis instructions to translate the tactics from the deception table entries into an exception subroutine, wherein one or more honey quivers are synthesized based on the tactic specified.

2. The cyber-deception system of claim 1, the hardware processor further configured to:
   execute one or more instructions of the intercepted system call; and
   return at least one result of the executed one or more instructions of the intercepted system call.

3. The cyber-deception system of claim 1, wherein the intercepted system call is determined to have originated from a malicious actor.

4. The cyber-deception system of claim 1, wherein the intercepted system call includes at least one attack vector including data integrity corruption, ransomware, privilege escalation, infostealers, buffer overflow exploits, privacy leakage, side-channels, or a combination thereof.

5. The cyber-deception system of claim 1, wherein the at least one deception strategy is at least one of a diversion strategy, a fabrication strategy, and an exhaustion strategy.

6. The cyber-deception system of claim 1, wherein the selected at least one subroutine invokes at least one exception.

7. The cyber-deception system of claim 1, wherein the at least one deception strategy is selected using a random number generator.

8. The cyber-deception system of claim 1, wherein the deception table is populated with one or more deception strategy entries received from the hardware processor used against malware types.

9. The cyber-deception system of claim 1, wherein the at least one subroutine is selected based on a number of the intercepted system call.

10. A deception trigger device, comprising:
    a hardware processor; and
    a memory coupled to the hardware processor, the memory having instructions stored thereon that when executed by the hardware processor implement:
    receiving a system call associated with an attacker, the system call having a system call number;
    reading the system call number of the received system call;
    recording the system call number in a register;
    invoking a system call-specific subroutine amongst a plurality of system call-specific subroutines, based on the system call number of the received system call; and
    implementing at least one deception strategy by executing the invoked system call-specific subroutine, wherein the at least one deception strategy includes one or more deception primitive data types include kernel boundaries to intercept malware system service requests and to enforce the at least one deception strategy at the hardware processor, wherein a system administrator, through a user interface, directly retrieves the appropriate format for a specified tactic comprising the deception primitive and mode from a deception table supported by a disclosed hardware.

11. The deception trigger device of claim 10, wherein, in response to the one or more deception primitives specifying at least one return-time manipulation of target fields, a system return tracker flag is set to 1.

12. The deception trigger device of claim 11, wherein the at least one deception strategy is invoked for a system return when the system return tracker flag is set to 1 by the received system call.

13. The deception trigger device of claim 12, wherein the at least one deception strategy invoked for the system return uses the recorded number in the register and the system return tracker flag value to index a subroutine for return-time deception.

14. A deception trigger device, comprising:
    a hardware processor; and
    a memory coupled to the hardware processor, the memory having instructions stored thereon that when executed by the hardware processor implement:
    receiving a system call associated with an attacker, the system call having a system call number;
    reading the system call number of the received system call;
    recording the system call number in a register;
    invoking a system call-specific subroutine amongst a plurality of system call-specific subroutines, based on the system call number of the received system call; and
    implementing at least one deception strategy by executing the invoked system call-specific subroutine, wherein the at least one deception strategy includes a return-time deception, wherein a hardware-assisted random number generator triggers a random selection of an index to dynamically activates a deception tactic with one of an exception subroutine each time for each of the system call-specific subroutines, wherein at least one deception subroutine is executed during time of return for the received system call.

15. A deception trigger device, comprising:
    a hardware processor; and
    a memory coupled to the hardware processor, the memory having instructions stored thereon that when executed by the hardware processor implement:
    receiving a system call associated with an attacker, the system call having a system call number;
    reading the system call number of the received system call;
    recording the system call number in a register;
    invoking a system call-specific subroutine amongst a plurality of system call-specific subroutines, based on the system call number of the received system call; and
    implementing at least one deception strategy by executing the invoked system call-specific subroutine, wherein the at least one deception strategy includes a deception tactic received from triggering a hardware-assisted random number generator to randomly select an index and dynamically activates a deception tactic with one of a respective honey quivers an exception subroutine each time for each of the system call-specific subroutines, to provide useless bytes to the attacker by scrambling a read buffer using a SCRAMBLE RETURN primitive, which randomizes each byte value in REG mode of operation wherein the scrambling is an iterative loop based on the value held in a RDX register.

* * * * *